Jan. 1, 1935.   C. A. SABBAH   1,986,604
RECTIFIER COMPOUNDING SYSTEM
Filed April 14, 1932
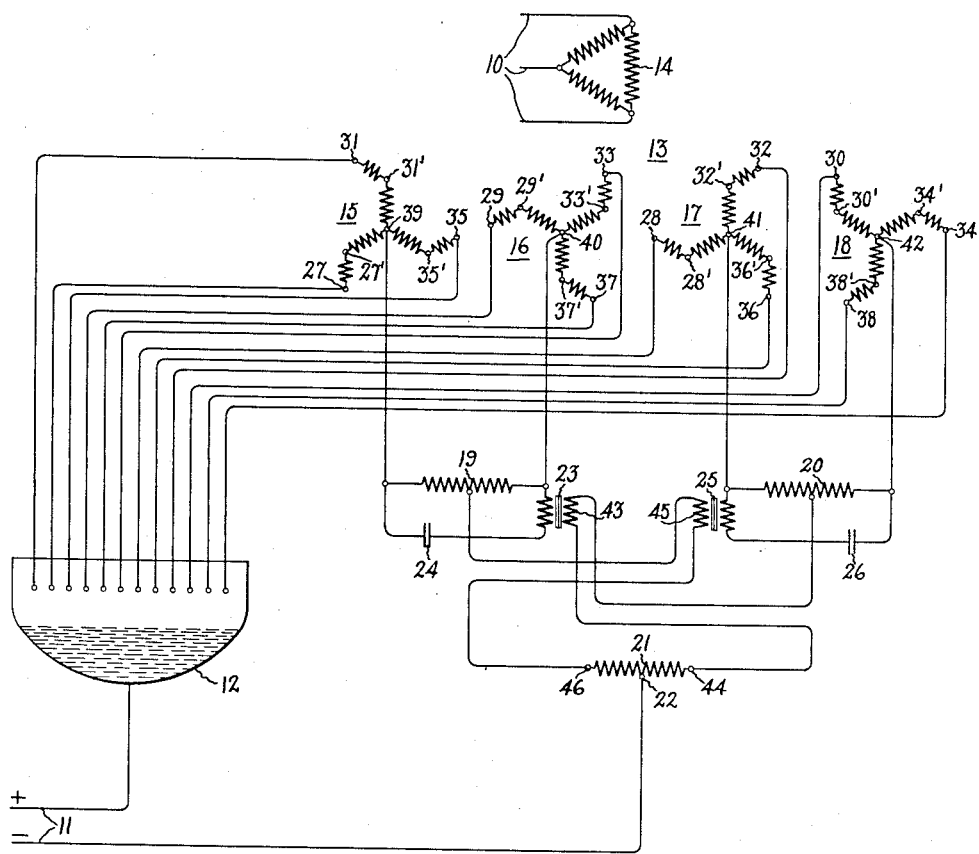
Inventor:
Camil A. Sabbah,
by Charles E. Tullar
His Attorney.

Patented Jan. 1, 1935

1,986,604

UNITED STATES PATENT OFFICE 1,986,604

RECTIFIER COMPOUNDING SYSTEM

Camil A. Sabbah, Schenectady, N. Y., assignor to General Electric Company, a corporation of New York Application April 14, 1932, Serial No. 605,270

8 Claims. (Cl. 175—363)

My invention relates to electric systems wherein power is interchanged between direct and alternating current circuits through means comprising an electric discharge apparatus such as a mercury arc rectifier, particularly to means for providing compound operation of such systems, and has for its principal object the provision of an improved arrangement whereby the voltage of the direct current circuit may be maintained substantially independent of variation in the magnitude of the direct current load or may be made to vary in a predetermined manner as this load increases.

In Patent No. 1,783,804 a rectifying apparatus is disclosed wherein regulation of the direct current circuit is effected by means of an interphase connection including predetermined inductive and capacitive impedances so arranged as to produce an effective impedance which varies inversely as a direct current load. This interphase connection may include a reactor, an auxiliary transformer and a condenser arranged to produce such variation in the impedance of the transformer connection that the output voltage of the rectifier will rise as the direct current load increases, the extent of this rise and the degree of compounding being determined by the constants of the interphase circuit connections.

It is sometimes desirable to utilize an interphase connection similar to the above to regulate the voltage of rectifiers or the like which are arranged for 12-phase operation. As is well understood by those skilled in the art, a 12-phase rectifying system may be made up of two 6-phase systems each of which includes an interphase transformer, a reactor and a condenser. In the adaptation to such 12-phase systems of the above invention disclosed in the above-mentioned Patent No. 1,783,804 difficulty has been encountered due to the fact that the reactive voltage of the main transformer tends to cause unequal distribution of the load between the two interphase connections, one of the interphase connections being subjected to the larger load when the phase rotation of the main transformer is in one direction and the other interphase transformer connection having the larger load when the phase rotation of the main transformer is in the opposite direction.

In order to minimize or obviate this difficulty it has been proposed, as set forth in Patent No. 1,854,945, to provide an interconnection between the different interphase connections whereby it was intended that the effect of the reactive voltage generated in the main transformer windings should be neutralized and the unbalanced condition above mentioned corrected. However, even with the addition of the balancing means disclosed in the latter above mentioned Patent No. 1,854,945 considerable difficulties have been experienced when the attempt has been made to operate a rectifier, especially when fully compounded, embodying the above described compounding means.

In accordance with my invention the above difficulties are obviated by the provision of a cross-compounding arrangement for a 12-phase rectifier system made up as above described of two 6-phase systems, whereby the output current of each 6-phase system controls the saturation of the reactor incorporated in the other 6-phase system thereby counteracting any tendency to unbalance in the loads of the two 6-phase systems.

My invention will be better understood by reference to the following description when considered in connection with the accompanying drawing and its scope will be pointed out in the appended claims.

Referring to the drawing the single figure thereof is a diagrammatic representation of a rectifier system in which my invention has been embodied.

In the figure the rectifier system includes alternating current supply terminals 10 and direct current terminals 11 between which power is transmitted through an electric discharge apparatus such as a rectifier 12 and a main transformer 13. The transformer 13 is provided with a primary winding 14 and with four sets of windings arranged to form four star connected zig-zag wound secondary windings 15, 16, 17 and 18. The neutral terminals of the secondary windings 15 and 16 are interconnected through an interphase transformer 19 and the neutral terminals of the secondary windings 17 and 18 are likewise interconnected through an interphase transformer 20. Connected between the interphase transformers 19 and 20 is a winding 21 or 3rd interphase transformer provided with a mid-terminal 22 which is connected to the negative side of the direct current circuit.

The transformer windings 15 and 16 form in effect a 6-phase system. The interphase connection of this system includes the interphase transformer 19, a reactor 23 and a condenser 24. The interphase connection of the 6-phase system formed by the windings 17 and 18 includes the interphase transformer 20, a reactor 25 and a condenser 26.

As previously explained, the effect of the reactive voltage in the main transformer 13 is to cause the 6-phase system including the windings 15 and 16 to take more load than the 6-phase system including the windings 17 and 18 when the phase rotation of the transformer 13 is in one direction and to cause the 6-phase system including the windings 17 and 18 to take more load than the 6-phase system including the windings 15 and 16 when the phase rotation of the transformer 13 is in the opposite direction.

The secondary phase terminals 27 to 38 are connected respectively to the anodes of rectifier 12, which fire or start to carry current in the order determined by the sequence of numerals 27 to 38 representing these phase terminals in the drawing. The numerals 39, 40, 41, 42 represent respectively the neutral terminals of secondaries 15, 16, 17, 18 and the numerals 27' to 38' represent the connection points of the main windings and the corresponding stub windings of these zig-zag wound star-connected secondaries 15, 16, 17, 18.

Assuming that at a given time the anodes which are active are those connected to terminals 30, 31, 32, 33 respectively, then when that anode starts which is next in the firing sequence, i. e. the anode which is connected to terminal 34 of the 6-phase system comprising secondaries 17, 18, the commutating process adds to the voltage in phase 42, 30 half of the difference between the voltages in phase 42, 34 and phase 42, 30. But since the stub winding portion 30', 30 of phase 42, 30, of the 6-phase system comprising secondaries 17, 18, is in the same direction as the main winding portion 39, 31' of phase 39, 31, which is in the 6-phase system comprising secondaries 15, 16, the voltage of phase 39, 31 will be raised a corresponding amount if the coupling between phases is 100%, or will be raised a less amount in accordance with the magnetic linkage.

As a result of the above described action the phase voltage and hence the direct current voltage of the 6-phase system comprising secondaries 15, 16 will be increased since the anode connected to phase 39, 31 is active. The anode current of the group will also be increased.

Assuming next that the anodes connected to terminals 31, 32, 33, 34 are active, then when the succeeding anode starts, which is the anode connected to terminal 35 of the 6-phase system comprising secondaries 15, 16, half of the commutating voltage will be added to phase 39, 31. Since the stub winding portion 31', 31 of phase 39, 31 is in the same direction as the main winding 42, 30' of phase 42, 30, of the 6-phase system comprising secondaries 17, 18, the voltage of phase 42, 30 will be increased. However, since the anode connected to phase 42, 30 is idle the direct current output of the 6-phase system comprising secondaries 17, 18 will not be increased.

It will be readily understood from the foregoing analysis that when the alternate groups of anodes connected to the six alternate groups of terminals 30 to 33, 32 to 35,—28 to 31 are active the direct current output of the 6-phase system comprising secondaries 15, 16 will be increased, while when the alternate groups of anodes connected to the six alternate groups of terminals 31 to 34, 33 to 36—29 to 32 are active the direct current output of the 6-phase system comprising secondaries 17, 18 is not increased. The net result of the commutating action is to increase the direct current output from the 6-phase system comprising secondaries 15, 16 over that from the 6-phase system comprising secondaries 17, 18, thus causing unbalance as hereinbefore stated in the output from the two 6-phase systems. It is to be noted that if the 3rd interphase transformer 21 is not provided with an air gap this transformer will be saturated because of the excess direct current and such saturation will operate to accentuate the unbalance in output current in the two 6-phase systems.

It will be seen that if the foregoing explanation of the cause responsible for unbalance between the outputs of the two 6-phase systems is correct, then, first, reversal of direction of phase rotation should result in shifting the preponderance of load from one 6-phase system to the other. Load tests have shown such shifting to develop upon occurrence of reversal of the phase rotation. Second, since the commutating voltage rises with the direct current output the degree of boosting or increasing of the current and voltage in one of the 6-phase systems as hereinbefore described should increase as the direct current output increases. Load tests have shown a definite rise in percent of peak voltage of one of the 6-phase systems as compared with that of the other 6-phase system as the direct current load was increased.

In order to prevent the unbalancing of the two 6-phase systems I provide saturating windings for the reactors 23 and 25 associated respectively with the interphase connections of the two 6-phase groups. One of these saturating windings 43 is associated with reactor 23 forming part of the 6-phase system which includes main transformer secondaries 15, 16. This saturating winding 43 is connected in series between one end terminal 44 of the 3rd interphase transformer 21 and the neutral point of the interphase transformer 20 forming part of the 6-phase system including secondaries 17, 18. The other saturating winding 45 is associated with reactor 25 forming part of the 6-phase system which includes secondaries 17, 18. The latter saturating winding 45 is connected in series between the other end terminal 46 of 3rd interphase transformer 21 and the neutral point of the interphase transformer 19 forming part of the 6-phase system including secondaries 15, 16. The 3rd interphase transformer 21 is preferably provided with an air gap and arranged so that considerable leakage is present in the magnetic circuit.

Current from the 6-phase system or group comprising secondaries 15, 16 flows in the saturating winding 45 of the reactor 25 forming part of the interphase connection of the 6-phase system or group comprising secondaries 17, 18. Likewise current from the latter 6-phase system comprising secondaries 17, 18 flows in the saturating winding 43 of the reactor 23 forming part of the interphase connection of the 6-phase group comprising secondaries 15, 16.

Thus in operation of the rectifier system embodying the means for preventing unbalance in accordance with my invention the output current of each 6-phase system or group, traversing the saturating winding associated with the reactor forming part of the interphase connection of the other group, tends to saturate this reactor and thus cause compound operation of that other 6-phase group. At the same time by reason of the cross-compounding arrangement of the reactors and their associated saturating windings any tendency to unbalance in the output of the two 6-phase groups due to the causes hereinbefore explained or other causes is counteracted. Any increase in the current output of one group above the current output of the other group tends to increase correspondingly the degree of saturation of the reactor forming part of the compounding means of this other group, and thereby to increase the output voltage thereof sufficiently to equalize the current outputs of the two groups, oscillations of the load currents between upper and lower limits being also prevented.

While I have shown and described my invention with reference to an electric discharge apparatus of the vapor electric type and in which all of the anodes are enclosed in a single vessel it will be understood that I do not wish to be limited thereto, since any other suitable arrangement of electric discharge apparatus in which current is caused to flow unidirectionally between a negative conductor and a plurality of anodes, for rectifying or like purposes, may be employed. Thus while I have shown only a single embodiment of my invention it will be understood that many modifications may be made therein and that I contemplate by the appended claims to cover any such modification as falls within the true spirit and scope of my invention.

What I claim as new and desire to secure by Letters Patent of the United States is:

1. The combination of two polyphase systems each provided with two sets of main transformer windings each set having a neutral terminal, each of said polyphase systems being further provided with an interphase connection including a reactor connected between the neutral terminals of the corresponding two sets of said windings, an electric discharge apparatus, direct current terminals connected to said interphase connections and through said apparatus to said windings, and means responsive to the current in each of said polyphase systems to vary the saturation of the reactor connected between the neutral terminals of the two sets of said windings of the other polyphase system.

2. The combination of two 6-phase systems each provided with two 3-phase main transformer windings and with an interphase connection including a reactor connected between the neutral terminals of said windings, an electric discharge apparatus, direct current terminals connected to said interphase connections and through said discharge apparatus to said windings, and means responsive to the current in each of said 6-phase systems to vary the saturation of the reactor connected between the neutral terminals of the windings of the other 6-phase system.

3. The combination of two 6-phase systems each provided with two 3-phase main transformer windings and with an interphase connection including a condenser and a reactor connected between the neutral terminals of said windings, an electric discharge apparatus, direct current terminals connected to said interphase connections and through said discharge apparatus to said windings, and means responsive to the current in each of said 6-phase systems to vary the saturation of the reactor connected between the neutral terminals of the transformer windings of the other 6-phase system.

4. The combination of two polyphase systems each provided with two sets of main transformer windings and with an interphase connection including a reactor connected between the neutral terminals of said windings, an electric discharge apparatus, direct current terminals connected to said interphase connections and through said apparatus to said windings, and means to neutralize an effect of the reactive voltage of said windings including two windings each associated with a different one of said reactors to vary the saturation thereof, the saturating winding associated with the reactor included in one of said polyphase systems being energized in accordance with current in the other of said polyphase systems.

5. The combination of two polyphase systems each provided with two sets of main transformer windings and with an interphase connection including a condenser and a reactor connected between the neutral terminals of said windings, an electric discharge apparatus, direct current terminals connected to said interphase connections and through said apparatus to said windings, and means to neutralize an effect of the reactive voltage of said windings including two windings each associated with a different one of said reactors to vary the saturation thereof, the saturating winding associated with the reactor included in one of said polyphase systems being energized in accordance with current in the other of said polyphase systems.

6. The combination of two 6-phase systems each provided with two 3-phase main transformer windings and with an interphase connection including a reactor connected between the neutral terminals of said windings, an electric discharge apparatus, direct current terminals connected to said interphase connections and through said apparatus to said windings, and means to neutralize an effect of the reactive voltage of said windings including two windings each associated with a different one of said reactors to vary the saturation thereof, the saturating winding associated with the reactor included in one of said 6-phase systems being energized in accordance with current in the other of said 6-phase systems.

7. The combination of two 6-phase systems each provided with two 3-phase main transformer windings and with an interphase connection including a condenser and a reactor connected between the neutral terminals of said windings, an electric discharge apparatus, direct current terminals connected to said interphase connections and through said apparatus to said windings, and means to neutralize an effect of the reactive voltage of said windings including two windings each associated with a different one of said reactors to vary the saturation thereof, the saturating winding associated with the reactor included in one of said 6-phase systems being energized in accordance with current in the other of said 6-phase systems.

8. The combination of two polyphase systems each provided with two sets of main transformer windings, each set having a neutral terminal, each of said polyphase systems being further provided with an interphase connection including a condenser and a reactor connected between the neutral terminals of the corresponding two sets of said windings, an electric discharge apparatus, direct current terminals connected to said interphase connections and through said apparatus to said windings, and means responsive to the current in each of said polyphase systems to vary the saturation of the reactor connected between the neutral terminals of the two sets of said windings of the other polyphase system.

CAMIL A. SABBAH.